US010559320B2

United States Patent
Nakamura et al.

(10) Patent No.: US 10,559,320 B2
(45) Date of Patent: *Feb. 11, 2020

(54) MAGNETIC RECORDING MEDIUM AND MAGNETIC RECORDING/REPRODUCING APPARATUS

(71) Applicant: SHOWA DENKO K.K., Tokyo (JP)

(72) Inventors: Satoru Nakamura, Hsinchu (TW); Taining Hung, Hsinchu (TW); Evance Kuo, Hsinchu (TW); Daizo Endo, Hsinchu (TW)

(73) Assignee: SHOWA DENKO K.K., Minato-ku, Tokyo (JP)

(*) Notice: Subject to any disclaimer, the term of this patent is extended or adjusted under 35 U.S.C. 154(b) by 294 days.

This patent is subject to a terminal disclaimer.

(21) Appl. No.: 15/535,982

(22) PCT Filed: Dec. 16, 2015

(86) PCT No.: PCT/JP2015/085225
§ 371 (c)(1),
(2) Date: Jun. 14, 2017

(87) PCT Pub. No.: WO2016/098811
PCT Pub. Date: Jun. 23, 2016

(65) Prior Publication Data
US 2017/0337945 A1    Nov. 23, 2017

(30) Foreign Application Priority Data

Dec. 19, 2014  (JP) ................. 2014-257205
Jun. 12, 2015  (JP) ................. 2015-119737
Jun. 12, 2015  (JP) ................. 2015-119743

(51) Int. Cl.
*G11B 5/725*     (2006.01)
*C10M 107/38*    (2006.01)
(Continued)

(52) U.S. Cl.
CPC .......... *G11B 5/725* (2013.01); *C10M 105/54* (2013.01); *C10M 107/38* (2013.01);
(Continued)

(58) Field of Classification Search
CPC ..... G11B 5/725; C10M 7/38; C10M 2213/00; C10M 2213/04; C10M 2213/043;
(Continued)

(56) References Cited

U.S. PATENT DOCUMENTS 6,136,403 A    10/2000   Prabhakara et al.
6,875,492 B1 *  4/2005   Pirzada ............... G11B 5/72
                                                428/216
(Continued)

FOREIGN PATENT DOCUMENTS

CN    1989228 A     6/2007
CN    101121908 A   2/2008
(Continued)

OTHER PUBLICATIONS

Notice of Rejection for JP 2014-257205 dated Apr. 14, 2015.
(Continued)

*Primary Examiner* — Holly C Rickman
(74) *Attorney, Agent, or Firm* — Sughrue Mion, PLLC

(57) ABSTRACT

The present invention relates to a magnetic recording medium in which a lubricant layer contains a compound A represented by general formula (1) and a compound B represented by general formula (2), satisfying (A/B)=0.2 to 3.0, and has an average thickness of 0.8 nm to 2 nm. $R^1—C_6H_4OCH_2CH(OH)CH_2OCH_2—R^2—CH_2OCH_2CH(OH)CH_2OH$ ... (1) ($R^1$ is an alkoxy group having 1 to 4 carbon atoms. $R^2$ is $—CF_2O(CF_2CF_2O)_x(CF_2O)_yCF_2—$ (x, y=0 to 15), $—CF_2CF_2O(CF_2CF_2CF_2O)_zCF_2CF_2—$ (z=1 to 15), $—CF_2CF_2CF_2O(CF_2CF_2CF_2CF_2O)_nCF_2CF_2CF_2—$ (n=0 to 4). $HOCH_2CF_2CF_2O(CF_2CF_2CF_2O)_mCF_2CF_2CH_2OCH_2CH(OH)CH_2OH$ ... (2) (m is an integer).

5 Claims, 1 Drawing Sheet

(51) Int. Cl.
*C10M 105/54* (2006.01)
*C10M 111/04* (2006.01)

(52) U.S. Cl.
CPC ... *C10M 111/04* (2013.01); *C10M 2211/0425* (2013.01); *C10M 2213/043* (2013.01); *C10N 2240/204* (2013.01); *C10N 2250/08* (2013.01)

(58) Field of Classification Search
CPC ...... C10M 2213/06; C10M 2213/0606; C10N 2040/18; C10N 2240/204
See application file for complete search history.

(56) References Cited

U.S. PATENT DOCUMENTS

| | | | |
|---|---|---|---|
| 10,074,396 B2* | 9/2018 | Yamakawa | G11B 19/28 |
| 10,079,036 B2* | 9/2018 | Nakamura | G11B 5/72 |
| 10,199,064 B2* | 2/2019 | Maruyama | G11B 5/725 |
| 2011/0064970 A1* | 3/2011 | Chen | C10M 157/10 428/833 |
| 2013/0083422 A1 | 4/2013 | Ooeda et al. | |
| 2013/0209837 A1* | 8/2013 | Sagata | G11B 5/725 428/833 |
| 2014/0139946 A1 | 5/2014 | Ota | |
| 2014/0212692 A1* | 7/2014 | Matsumoto | C10M 169/04 428/832 |
| 2016/0240219 A1 | 8/2016 | Maruyama et al. | |
| 2017/0011765 A1 | 1/2017 | Nakamura et al. | |

FOREIGN PATENT DOCUMENTS

| | | |
|---|---|---|
| CN | 102203226 A | 9/2011 |
| CN | 102356431 A | 2/2012 |
| CN | 107004430 A | 8/2017 |
| JP | 62-066417 A | 3/1987 |
| JP | 02-010518 A | 1/1990 |
| JP | 6-333231 A | 12/1994 |
| JP | 09-288818 A | 4/1997 |
| JP | 09-171615 A | 6/1997 |
| JP | 09-282642 A | 10/1997 |
| JP | 10-049853 A | 2/1998 |
| JP | 2002-275484 A | 9/2002 |
| JP | 2005-122790 A | 5/2005 |
| JP | 2009-211765 A | 9/2009 |
| JP | 2009-289411 A | 12/2009 |
| JP | 2010-108583 A | 5/2010 |
| JP | 2013-157048 A | 8/2013 |
| JP | 2013-163667 A | 8/2013 |
| JP | 2014-116060 A | 6/2014 |

OTHER PUBLICATIONS

International Search Report for PCT/JP2015/085225 dated Mar. 1, 2016.
Communication dated May 12, 2015 from the Japanese Patent Office in Application No. 2015-029178.
An Office Action dated Mar. 30, 2018, which issued during the prosecution of U.S. Appl. No. 15/264,988.
An Office Action dated Feb. 12, 2018, which issued during the prosecution of U.S. Appl. No. 15/202,674.
Communication dated Apr. 4, 2018 from the State Intellectual Property Office of the P.R.C. in Application No. 201610088013.8.
Communication dated Aug. 7, 2018, from the State Intellectual Property Office of People's Republic of China in counterpart Application No. 201610806763.4.
Communication dated May 22, 2018, from the Japanese Patent office in application No. 2015-134652.
Communication dated Jun. 28, 2018, from State Intellectual Property Office of the P.R.C in Chinese Application No. 201610487247.X.
An Office Action dated Feb. 13, 2018, which issued during the prosecution of U.S. Appl. No. 15/044,529.

* cited by examiner

MAGNETIC RECORDING MEDIUM AND MAGNETIC RECORDING/REPRODUCING APPARATUS

TECHNICAL FIELD

The present invention relates to a magnetic recording medium suitably used for a magnetic recording/reproducing apparatus such as a hard disk drive, and a magnetic recording/reproducing apparatus including the same.

This application is a National Stage of International Application No. PCT/JP2015/085225 filed Dec. 16, 2015, claiming priority based on Japanese Patent Application No. 2014-257205 filed in Japan on Dec. 19, 2014, Japanese Patent Application No. 2015-119737 filed in Japan on Jun. 12, 2015, and Japanese Patent Application No. 2015-119743 filed in Japan on Jun. 12, 2015, the contents of all of which are incorporated herein by reference in their entirety.

BACKGROUND ART

In order to improve recording density of a magnetic recording/reproducing apparatus, development of a magnetic recording medium suitable for high recording density is proceeding.

A magnetic recording medium includes a magnetic layer for recording information, a protective layer made of carbon or the like, and a lubricant layer in this order on a substrate for a magnetic recording medium.

The protective layer protects information recorded on the magnetic layer and enhances slidability of a magnetic head with respect to the magnetic recording medium. However, sufficient durability of the magnetic recording medium cannot be obtained only by providing the protective layer on the magnetic layer.

Therefore, in general, a lubricant is applied to a surface of the protective layer to form a lubricant layer, thereby improving the durability of the magnetic recording medium. By providing the lubricant layer, direct contact between the magnetic head of the magnetic recording/reproducing apparatus and the protective layer can be prevented. In addition, by providing the lubricant layer, frictional force between the magnetic recording medium and the magnetic head sliding on the magnetic recording medium is remarkably reduced. Further, the lubricant layer has a role of preventing corrosion of the magnetic layer or the like of the magnetic recording medium due to impurities invading from the surrounding environment.

Conventionally, as the lubricant used for the lubricant layer of the magnetic recording medium, a perfluoropolyether lubricant and aliphatic hydrocarbon lubricant are used. For example, Patent Document 1 discloses a magnetic recording medium obtained by coating a lubricant of a perfluoroalkyl polyether having a structure of $HOCH_2$—$CF_2O$—$(C_2F_4O)p$-$(CF_2O)q$-$CH_2OH$ (p, q is an integer) on a protective layer made of carbon or the like.

Patent Document 2 discloses a magnetic recording medium obtained by coating a lubricant of a perfluoroalkylpolyether represented by $HOCH_2CH(OH)$—$CH_2OCH_2CF_2O$—$(C_2F_4O)p$-$(CF_2O)q$-$CF_2CH_2OCH_2$—$CH(OH)CH_2OH$ (p, q is an integer).

Patent Document 3 describes a magnetic recording medium having a lubricant layer containing a mixture of a phosphazene compound and a compound having a perfluorooxyalkylene unit in a specific range of mixing ratios. In addition, Patent Document 3 discloses that the lubricant layer has a high bonding force with a protective layer and a high coverage can be obtained even when the layer thickness of the protective layer is lowered.

Patent Literature 4 discloses a lubricant containing a compound represented by $R^1$—$C_6H_4O$—$CH_2CH(OH)CH_2OCH_2$—$R^2$—$CH_2$—$O$—$R^3$.

Patent Document 1: Japanese Unexamined Patent Publication No. 62-66417
Patent Document 2: Japanese Unexamined Patent Publication No. 9-282642
Patent Document 3: Japanese Patent Application Laid-Open No. 2010-108583
Patent Document 4: Japanese Unexamined Patent Publication No. 2013-163667

SUMMARY OF THE INVENTION

In a magnetic recording/reproducing apparatus, it is required to further increase a recording density and reduce a flying height of the magnetic head. In order to satisfy this requirement, it is preferable to make a thickness of the lubricant layer of the magnetic recording medium thinner. However, when the thickness of the lubricant layer is thin, voids are easily formed in the lubricant layer. As a result, the coverage of the lubricant layer covering the surface of the protective layer is reduced. When an environmental substance that causes contaminants to penetrate into the lower layer of the lubricant layer from voids of the lubricant layer having a low coverage ratio, contaminants, such as ionic impurities, which contaminate the magnetic recording medium are generated by introducing the environmental substances.

The present invention has been made in view of the above circumstances, and it is an object of the present invention to provide a magnetic recording medium in which the surface of a protective layer is covered with a high coverage and a high bonding force by a sufficiently thin lubricant layer and to provide a magnetic recording/reproducing apparatus.

In order to solve the above problems, the inventor of the present invention conducted intensive studies as described below.

That is, it is known that the higher the number of OH groups contained in the molecular structure of the compound used as the material of the lubricant layer is, the higher the bonding force with the protective layer made of carbon or the like is. For this reason, the number of OH groups contained in the compound used for the lubricant layer conventionally tends to increase to 2, 4, 6, or 8.

However, as a result of investigation by the present inventors, it has been found that when the number of OH groups in the compound is increased, the surface energy of the magnetic recording medium having the lubricant layer containing this compound is increased by the interaction between the OH groups. Also, increasing the number of OH groups in the compound may increase the molecular weight of the compound. Therefore, the viscosity of the lubricant containing the compound increases, and the coatability of the lubricant decreases. As a result, the lubricant layer formed by coating the lubricant may become island-like pattern or mesh-like pattern.

Therefore, in order to optimize the material of the lubricant layer, the present inventors conduct studies focusing attention on the surface energy of the magnetic recording medium. Conventionally, as a method for evaluating the coverage of the lubricant layer formed on the surface of the magnetic recording medium, an indirect method of forming a lubricant layer on the magnetic layer and the evaluating corrosion resistance under a high temperature and high humidity environment is used. A direct analysis method is difficult because the thickness of the lubricant layer of the magnetic recording medium is as thin as about 1 nm. It makes it difficult to optimize the material of the lubricant layer. On the other hand, the inventors of the present invention found that the total surface energy (hereinafter may be referred to as "$\gamma^{total}$" in some cases) on the surface of the magnetic recording medium can be calculated and found that it is sufficient to form a lubricant layer having a sufficiently low $\gamma^{total}$.

When $\gamma^{AB}$ is a parameter representing a bonding force between the lubricant layer and the protective layer and $\gamma^{LW}$ is a parameter representing the coverage of the lubricant, the total energy ($\gamma^{total}=\gamma^{AB}+\gamma^{LW}$ (the unit of $\gamma^{total}$, $\gamma^{AB}$, $\gamma^{LW}$ is mJ/m$^2$)). $\gamma^{AB}$, $\gamma^{LW}$ can be calculated by, for example, the method described in "The Measurement of Surface Energy of Polymers by Means of Contact Angles of Liquids on Solid Surfaces" (2004, Finn Knut Hansen, University of Oslo). A lower $\gamma^{AB}$ indicates a higher bonding force, and a lower $\gamma^{LW}$ indicates a higher coverage.

Therefore, when the lubricant layer has a low $\gamma^{AB}$ and $\gamma^{LW}$ (that is, low surface energy ($\gamma^{total}$)), it is less likely to generate island-like or mesh-like pattern even when the thickness is thin and the layer has a high covering property and bonding force to the surface of the protective layer.

The inventors of the present invention have repeatedly studied materials capable of obtaining a lubricant layer having a low surface energy ($\gamma^{total}$). As a result, a lubricant layer having sufficiently low surface energy ($\gamma^{total}$) can be obtained by setting a layer to have a predetermined thickness and to contain a compound A represented by the following general formula (1) and a compound B represented by the following general formula (2) at a predetermined ratio. It was confirmed that such the lubricant layer had a high coatability and bonding force to the surface of the protective layer, and the present invention as described below was completed.

[1] A magnetic recording medium comprising at least a magnetic layer, a protective layer and a lubricant layer in this order on a non-magnetic substrate, wherein the protective layer is made of carbon or carbon nitride; the lubricant layer which is formed on and in contact with the protective layer, comprises a compound A represented by the following general formula (1):

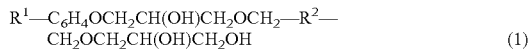  (1)

wherein, R$^1$ is an alkoxy group having 1 to 4 carbon atoms, R$^2$ is —CF$_2$O(CF$_2$CF$_2$O)$_x$(CF$_2$O)$_y$CF$_2$—, wherein in parentheses of x and y, connection in this order, in reverse, or randomly; and x, y are real numbers of 0 to 15, respectively, —CF$_2$CF$_2$O(CF$_2$CF$_2$CF$_2$O)$_z$CF$_2$CF$_2$—, wherein z is a real number of 1 to 15, or —CF$_2$CF$_2$CF$_2$O(CF$_2$CF$_2$CF$_2$CF$_2$O)$_n$CF$_2$CF$_2$CF$_2$—, wherein n is a real number from 0 to 4, and a compound B represented by the following general formula (2):

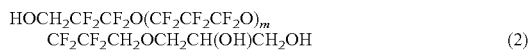  (2)

wherein m is an integer; a mass ratio (A/B) of the compound A with respect to the compound B is in the range of 0.2 to 3.0; and an average film thickness of the lubricant layer is 0.8 nm to 2 nm.

[2] The magnetic recording medium according to [1], wherein the total surface energy on the surface of the magnetic recording medium is 25.5 mJ/m$^2$ or less.

[3] The magnetic recording medium according to claim 1, wherein the compound A has an average molecular weight in the range of 1,500 to 1,800.

[4] The magnetic recording medium according to claim 1, wherein the compound B has an average molecular weight in the range of 1,000 to 1,700.

[5] A magnetic recording apparatus comprising: the magnetic recording medium according to any one of [1] to [4]; a medium drive unit that drives the magnetic recording medium in a recording direction, a magnetic head for recording/reproducing information on the magnetic recording medium, a head driving unit for driving the magnetic head relative to the magnetic recording medium, and a recording/reproducing signal processing unit for processing a recording/reproducing signal from the magnetic head.

In the magnetic recording medium of the present invention, the lubricant layer, with a predetermined film thickness, formed on and in contact with the protective layer contains a compound A represented by the general formula (1) and a compound B represented by the general formula (2) at a predetermined ratio. Therefore, a magnetic recording medium in which the surface of the protective layer is covered with a high coverage and high bonding force is obtained by using the lubricant layer having a sufficiently small thickness.

Therefore, in the magnetic recording medium of the present invention, it is possible to prevent environmental substances that generate contaminants such as ionic impurities from penetrating through the voids of the lubricant layer and to prevent the magnetic recording medium from being contaminated by introducing environmental substances. Therefore, the magnetic recording medium of the present invention is excellent in environmental resistance and has stable magnetic recording/reproducing characteristics.

Further, since the magnetic recording medium of the present invention has a sufficiently thin lubricant layer, it is possible that a recording density of the magnetic recording medium of the present invention is further improved.

DETAILED DESCRIPTION OF THE INVENTION

Figure 1:
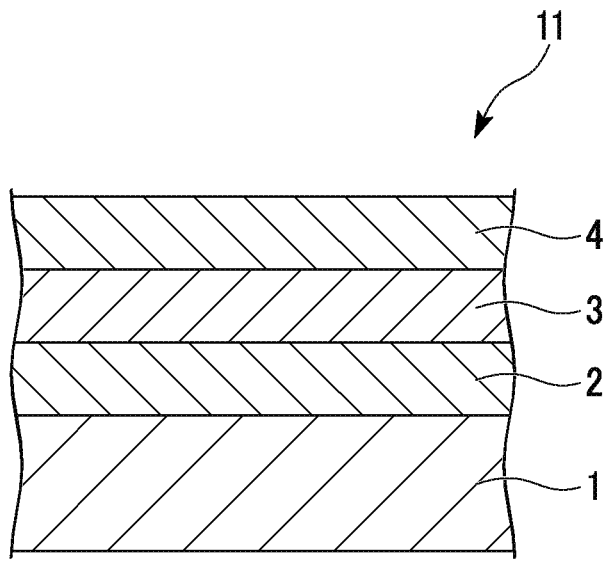
FIG. 1 is a schematic cross-sectional view showing an example of a magnetic recording medium of the present invention.

Hereinafter, the magnetic recording medium and the magnetic recording/reproducing apparatus of the present invention will be described in detail. It should be noted that the present invention is not limited to only the embodiments described below.

First, the lubricant layer formed in contact with the protective layer made of carbon or carbon nitride in the magnetic recording medium of the present invention will be described.

(Lubricant Layer)

As described above, the inventor of the present invention focused a study on the surface energy of the magnetic recording medium with respect to the optimization of a material of a lubricant layer. A lubricant layer capable of reducing $\gamma^{total}$ ($\gamma^{total}=\gamma^{AB}+\gamma^{LW}$) which is the total surface energy on the surface of the magnetic recording medium was studied.

$\gamma^{AB}$ is a surface energy contributed by the interaction of Lewis acid-base. By using $\gamma^{AB}$, it is possible to estimate the equilibrium state of the electrons present in the protective layer and the lubricant layer. Generally, the protective layer (Lewis base) is an electron donor and the lubricant layer (Lewis acid) is an electron acceptor. The fact that a value of $\gamma^{AB}$ is low means that the interaction between the protective layer and the lubricant layer is sufficiently exerted. Therefore, when the value of $\gamma^{AB}$ is low, it can be considered that the bonding force between the lubricant layer and the protective layer is high.

$\gamma^{LW}$ is a surface energy showing London dispersive power or van der Waals force based on Dipole-Dipole quantum theory. By using $\gamma^{LW}$, a dispersibility of a compound forming the lubricant layer can be estimated. The fact that a value of $\gamma^{LW}$ is low means that a coverage of the lubricant layer is sufficiently exhibited. Therefore, the fact that the value of $\gamma^{LW}$ is low means that the effect of prevent the exposure of the protective layer is high (coverage ratio is high).

$\gamma^{AB}$, $\gamma^{LW}$ are calculated by the following method. First, a contact angle on the protective layer of the magnetic recording medium is measured using three kinds of solvents (a solvent A, solvent B, and solvent C).

The contact angle can be measured by a known method. That is, a certain amount of solvent is dropped on the surface of the protective layer of the magnetic recording medium, and then an angle formed by the water droplet and the surface of the protective layer after a certain period of time is measured with a contact angle meter.

In the present invention, water is used as the solvent A, methylene iodide as the solvent B, and ethylene glycol as the solvent C. The contact angle is $\theta_A$ when the solvent A is used, the contact angle is $\theta_B$ when the solvent B is used, and the contact angle is used is $\theta_C$ when the solvent C.

The formulas and parameters used for calculating $\gamma^{AB}$, $\gamma^{LW}$ are shown as follows.

In the following formula, the numeral 1 in the code such as "$\gamma_1^+$" indicates that it is a solvent parameter, and the numeral 2 in the code such as "$\gamma_2^+$" indicates the parameter of the lubricant. Also, "+" in the code such as "$\gamma_1^+$" indicates that it is a parameter showing contribution of an electron-accepting of Van Oss method, and "−" in the code such as "$\gamma_1^-$" indicates that it is a parameter showing contribution of an electron-donating of Van Oss method.

$\gamma^{total}$, $\gamma^{AB}$, $\gamma^{LW}$ are obtained by solving the following simultaneous equations using the solvents A to C, in which $\gamma_1$, $\gamma_1^{LW}$, $\gamma_1^+$ and $\gamma_1^-$ are known.

$$\gamma^{AB}=2(\gamma_1^+\gamma_2^-)^{1/2}+2(\gamma_1^-\gamma_2^+)^{1/2}$$

$$\gamma^{LW}=2(\gamma_1^{LW}\gamma_2^{LW})^{1/2}$$

$$\gamma_{1A}(1+\cos\theta_A)=2(\gamma_{1A}^{LW}\gamma_2^{LW})^{1/2}+2(\gamma_{1A}^+\gamma_2^-)^{1/2}+2(\gamma_{1A}^-\gamma_2^+)^{1/2}$$

$$\gamma_{1B}(1+\cos\theta_B)=2(\gamma_{1B}^{LW}\gamma_2^{LW})^{1/2}+2(\gamma_{1B}^+\gamma_2^-)^{1/2}+2(\gamma_{1B}^-\gamma_2^+)^{1/2}$$

$$\gamma_{1C}(1+\cos\theta_C)=2(\gamma_{1C}^{LW}\gamma_2^{LW})^{1/2}+2(\gamma_{1C}^+\gamma_2^-)^{1/2}+2(\gamma_{1C}^-\gamma_2^+)^{1/2}$$

Water: $\gamma_{1A}=720.8$, $\gamma_{1A}^{LW}=21.8$, $\gamma_{1A}^+=25.5$, $\gamma_{1A}^-=250.5$
Methylene iodide: $\gamma_{1B}=50.8$, $\gamma_{1B}^{LW}=50.8$, $\gamma_{1B}^+=0$, $\gamma_{1B}^-=0$
Ethylene glycol: $\gamma_{1C}=48.0$, $\gamma_{1C}^{LW}=290.0$, $\gamma_{1C}^+=1.92$, $\gamma_{1C}^-=470.0$ The lubricant layer of the magnetic recording medium of the present embodiment preferably has a total surface energy ($\gamma^{total}$) of 27.25 mJ/m² or less on the surface of the magnetic recording medium, which is calculated by the above method. The total surface energy ($\gamma^{total}$) is preferably 27.0 mJ/m² or less, and more preferably 25.5 mJ/m² or less. When the surface energy ($\gamma^{total}$) is 27.25 mJ/m² or less, a magnetic recording medium in which a surface of a protective layer is covered with a lubricant layer with a high coverage and high bonding force can be obtained The lubricant layer of the magnetic recording medium of the present embodiment includes the compound A represented by the general formula (1) and the compound B represented by the general formula (2). In order to obtain a lubricant layer having a low surface energy ($\gamma^{total}$), it is necessary to suppress the interaction between the OH groups in the compound contained in the lubricant layer. Therefore, in the present embodiment, as the compound A and the compound B, those having three OH groups contained in the molecular structure are used. Further, in Compound A and Compound B, the number of OH groups contained in the molecular structure is three. Therefore, as compared with a compound having 4 or more OH groups, it is possible to obtain a compound having a preferable molecular weight. Therefore, the lubricant layer formed by coating the lubricant containing the compound A and the compound B is preferable because it becomes difficult for the lubricant layer to generate an island-like pattern or a mesh-like pattern. In addition, since the lubricant layer contains the compound A and the compound B, the lubricant layer having a high bonding force to the protective layer is more excellent as compared with the case of using the compound having one or more OH groups.

The compound A represented by the above general formula (1) mainly contributes to the coverage of the lubricant layer on the surface of the protective layer. When the lubricant layer contains the compound A, the value of $\gamma^{LW}$ decreases and the surface energy ($\gamma^{total}$) tends to decrease.

The average molecular weight of the compound A represented by the general formula (1) is preferably in the range of 1500 to 2000, and more preferably the average molecular weight is in the range of 1500 to 1800. When the average molecular weight of the compound A is within the above range, a lubricant which is sufficiently low in viscosity and is easy to be coated can be obtained when a lubricant layer is formed by applying a lubricant containing the compound A and the compound B. Since a lubricant which is less viscous and is easy to be coated can be obtained, the average molecular weight of the compound A is preferably in the range of 1,500 to 1,800. In addition, when the average molecular weight of the compound A is more than 1800 and 2000 or more, a lubricant layer, whose thickness is hardly reduced even when it is used under a high temperature and high humidity environment, can be obtained, and excellent durability can be obtained.

For example, as disclosed in Patent Document 4, the compound A represented by the general formula (1) can be synthesized by reacting a linear fluoropolyether having a hydroxyl group at one end and a hydroxyalkyl group at the other end, with a phenoxy compound having an epoxy group.

For example, ART-1 (trade name), DART-1 (trade name), or the like manufactured by MORESCO Co., Ltd. can be used as the commercially available compound A represented by the general formula (1).

In ART-1, $R^1$ in the general formula (1) is an alkoxy group having 1 carbon atom, and $R^2$ is $-CF_2O(CF_2CF_2O)_x(CF_2$ O)$_y$CF$_2$—. ART-1 is a compound in which x and y of R$^2$ are adjusted so that the average molecular weight is in the range of 1500 to 1800.

In DART-1, R$^1$ in the general formula (1) is an alkoxy group having 1 carbon atom and R$^2$ is —CF$_2$CF$_2$O (CF$_2$CF$_2$CF$_2$O)$_z$CF$_2$CF$_2$—. DART-1 is a compound in which z of R$^2$ is adjusted so that the average molecular weight is in the range of 1500 to 2000.

The compound B represented by the above general formula (2) mainly contributes to the bonding force between the protective layer and the lubricant layer. When the lubricant layer contains the compound B, the value of $\gamma^{AB}$ decreases and the surface energy ($\gamma^{total}$) tends to decrease.

The average molecular weight of the compound B represented by the general formula (2) is preferably in the range of 1000 to 2000, and more preferably in the range of 1000 to 1,700. Since a lubricant having sufficiently low viscosity and easy to be coated is obtained when the lubricant layer containing a compound A and a compound B is coated to form a lubricant layer, the average molecular weight of the compound B is preferably within the above range. The average molecular weight of the compound B is preferably in the range of 1,000 to 1,700, so that a lubricant which is even less viscous and easy to be coated can be obtained. In addition, when the average molecular weight of the compound B is more than 1,700 and 2,000 or less, a lubricant layer, whose thickness is not easily reduced even when used under a high temperature and high humidity environment, can be obtained, and excellent durability can be obtained.

The compound B represented by the general formula (2) can be produced, for example, by the following method. An alcohol used as a precursor of perfluoropolyether containing the basic skeleton of compound B is synthesized, and a mixture having an end group structure of a diol compound, a triol compound, and a tetraol compound is synthesized by modifying the alcohol. Thereafter, only a triol compound of the compound B is separated and purified from this mixture.

The lubricant layer of the magnetic recording medium of the present embodiment has a mass ratio (A/B) of the compound A represented by the general formula (1) to the compound B represented by the general formula (2) in the range of 0.2 to 3.0, and preferably within the range of 0.25 to 2.3. By setting the mass ratio (A/B) within the range of 0.2 to 3.0, the surface of the protective layer is covered with the lubricant layer with a high coverage and high bonding force.

When the mass ratio (A/B) exceeds 3.0, the compound B becomes deficient. For this reason, the lubricant layer tends to be island-like pattern and the coverage of the protective layer becomes insufficient. In addition, when the mass ratio (A/B) is less than 0.2, the compound A becomes deficient. For this reason, the lubricant layer tends to be in a mesh-like pattern, and the bonding force between the protective layer and the lubricant layer becomes insufficient.

The average film thickness of the lubricant layer is in the range of 0.8 nm (8 Å) to 2 nm (20 Å), and preferably in the range of 1 nm to 1.9 nm. By setting the average film thickness of the lubricant layer to 0.8 nm or more, the lubricant layer does not become island-like pattern or mesh-like pattern, and the lubricant layer allows the surface of the protective layer to be uniformly coated with a high coverage ratio. The thicker the average film thickness of the lubricant layer is, the lower the values of $\gamma^{AB}$ and $\gamma^{LW}$ is, and the lower the surface energy ($\gamma^{total}$) is. Therefore, as the average film thickness of the lubricant layer is increased, the surface of the protective layer is covered with the lubricant layer with a high coverage and a high bonding force. By setting the average film thickness of the lubricant layer to 2 nm or less, the flying height of the magnetic head can be decreased sufficiently, and the recording density of the magnetic recording medium can be increased.

(Magnetic Recording Medium)

Hereinafter, embodiments of the present invention will be described in detail with reference to the drawings.

FIG. 1 is a schematic cross-sectional view showing an example of a magnetic recording medium according to an embodiment of the present invention.

As shown in FIG. 1, the magnetic recording medium 11 of the present embodiment has a structure in which a magnetic layer 2, a protective layer 3, and the lubricant layer 4 of the above-described embodiment are stacked in this order on a non-magnetic substrate 1.

In the present embodiment, for example, an adhesion layer, a soft magnetic underlayer, a seed layer, and an orientation control layer are stacked in this order between the non-magnetic substrate 1 and the magnetic layer 2. The adhesion layer, the soft magnetic underlayer, the seed layer, and the orientation control layer are provided as necessary, and some or all of these may not be provided.

As the non-magnetic substrate 1, it is possible to use a substrate which includes a base substrate made of a metal material such as Al or an alloy material such as an Al alloy, and a film made of NiP or NiP alloy, which is formed on the base substrate. As the non-magnetic substrate 1, a substrate made of a nonmetallic material such as glass, ceramics, silicon, silicon carbide, carbon, resin or the like may be used, or a substrate which includes a base substrate made of the above-mentioned nonmetallic material a film made of non-magnetic material as NiP or NiP alloy, which is formed on the base substrate may be used.

The adhesion layer is provided for preventing corrosion of the non-magnetic substrate 1 when the non-magnetic substrate 1 and the soft magnetic underlayer provided on the adhesion layer are disposed in contact with each other. As the material of the adhesion layer, for example, Cr, Cr alloy, Ti, Ti alloy or the like can be selected appropriately. The thickness of the adhesion layer is preferably 2 nm or more so that the effect of providing the adhesion layer can be sufficiently obtained.

The adhesion layer can be formed by, for example, a sputtering method.

It is preferable that the soft magnetic underlayer has a structure in which a first soft magnetic film, an intermediate layer made of a Ru film, and a second soft magnetic film are sequentially stacked. It is preferable that an intermediate layer made of a Ru film is interposed between the two soft magnetic films so that the upper and lower soft magnetic films with respect to the intermediate layer have a structure in which anti-ferro coupling (AFC) is coupled. When the soft magnetic underlayer has AFC coupled structure, resistance to external magnetic field can be increased, and tolerance against WATE (Wide Area Tack Erasure) phenomenon, which is a problem peculiar to perpendicular magnetic recording, can also be obtained.

The film thickness of the soft magnetic underlayer is preferably in the range of 15 to 80 nm, and more preferably in the range of 20 to 50 nm. It is not preferable that the film thickness of the soft magnetic underlayer is less than 15 nm, because the magnetic flux from the magnetic head cannot be adequately absorbed, and therefore writing is insufficient. As a result, the recording/reproducing characteristics may deteriorate. On the other hand, it is not preferable that the film thickness of the soft magnetic underlayer exceeds 80 nm, because the productivity is noticeably lowered.

It is preferable that the first and second soft magnetic layers are made of a CoFe alloy. When the first and second soft magnetic layers are made of the CoFe alloy, a high saturation magnetic flux density Bs (1.4 (T) or more) can be realized. In addition, it is preferable to add one or more of Zr, Ta and Nb to the CoFe alloy used for the first and second soft magnetic layers. As a result, amorphization of the first and second soft magnetic films is promoted, and not only the orientation of the seed layer formed on the soft magnetic underlayer can be improved, but also the flying height of the magnetic head can be decreased.

The soft magnetic underlayer can be formed by, for example, a sputtering method.

The seed layer controls the orientation and crystal size of the orientation control layer and the magnetic layer 2 provided thereon. By providing the seed layer, the component in the direction perpendicular to the substrate surface of the magnetic flux generated from the magnetic head is increased, and the direction of magnetization of the magnetic layer 2 is more firmly fixed in the direction perpendicular to the non-magnetic substrate 1.

The seed layer is preferably made of a NiW alloy. When the seed layer is made of the NiW alloy, other elements such as B, Mn, Ru, Pt, Mo, Ta or the like may be added to the NiW alloy as necessary.

The film thickness of the seed layer is preferably in the range of 2 to 20 nm. When the film thickness of the seed layer is less than 2 nm, it is possible that the effect obtained by providing the seed layer cannot be sufficiently obtained. On the other hand, when the film thickness of the seed layer exceeds 20 nm, it is not preferable because the crystal size increases.

The seed layer can be formed by, for example, a sputtering method.

The orientation control layer is provided for controlling the orientation of the magnetic layer 2 so that it becomes favorable. The orientation control layer is preferably made of Ru or a Ru alloy.

The film thickness of the orientation control layer is preferably in the range of 5 to 30 nm. By making the film thickness of the orientation control layer 30 nm or less, the distance between the magnetic head and the soft magnetic underlayer becomes small, and the magnetic flux from the magnetic head can be sharpened. Further, by setting the film thickness of the orientation control layer to 5 nm or more, the orientation of the magnetic layer 2 can be favorably controlled.

The orientation control layer may be one layer or a plurality of layers. When the orientation control layer is a plurality of layers, all the orientation control layers may be made of the same material, or at least some of the orientation control layers may be different materials.

The orientation control layer can be formed by a sputtering method.

The magnetic layer 2 is made of a magnetic film whose easy axis of magnetization is oriented perpendicular to the substrate surface. The magnetic layer 2 contains Co and Pt and may further contain an oxide, or Cr, B, Cu, Ta, Zr or the like in order to improve the SNR characteristics.

Examples of the oxide contained in the magnetic layer 2 include $SiO_2$, SiO, $Cr_2O_3$, CoO, $Ta_2O_3$, $TiO_2$, and the like.

The magnetic layer 2 may be one layer or a plurality of layers having different compositions.

For example, when the magnetic layer 2 is composed of three layers of a first magnetic layer, a second magnetic layer, and a third magnetic layer, it is preferable that the first magnetic layer contains Co, Cr, Pt and, furthermore, it is a granular structure made from a material containing an oxide. As the oxide contained in the first magnetic layer, it is preferable to use an oxide of Cr, Si, Ta, Al, Ti, Mg, Co or the like. Among them, $TiO_2$, $Cr_2O_3$, $SiO_2$ or the like can be preferably used. In addition, the first magnetic layer is preferably composed of a composite oxide to which two or more oxides are added. Among them, $Cr_2O_3$—$SiO_2$, $Cr_2O_3$—$TiO_2$, $SiO_2$—$TiO_2$ or the like can be preferably used.

In addition to Co, Cr, Pt and an oxide, the first magnetic layer may further contain one or more elements selected from the group consisting of B, Ta, Mo, Cu, Nd, W, Nb, Sm, Tb, Ru, and Re.

By containing the above-mentioned elements in the first magnetic layer, it is possible to promote miniaturization of the magnetic particles, or to improve crystallinity and orientation. As a result, recording/reproducing characteristics and thermal fluctuation characteristics suitable for higher density recording can be obtained.

As the second magnetic layer, the same material as those of the first magnetic layer can be used. It is preferable that the second magnetic layer have a granular structure.

In addition, it is preferable that the third magnetic layer contains Co, Cr, or Pt, and it is a non-granular structure made of a material containing no oxide. In addition to Co, Cr, Pt, the third magnetic layer may further contain one or more elements selected from the group consisting of B, Ta. Mo, Cu, Nd, W, Nb, Sm, Tb, Ru, Re and Mn. When the third magnetic layer contains the above elements in addition to Co, Cr, and Pt, it is possible to promote miniaturization of the magnetic particles or to improve crystallinity and orientation. As a result, recording and reproduction characteristics and thermal fluctuation characteristics suitable for higher density recording can be obtained.

The thickness of the magnetic layer 2 is preferably 5 to 25 nm. When the thickness of the magnetic layer 2 is less than the above-mentioned range, a sufficient reproduction output cannot be obtained and thermal fluctuation characteristics are also deteriorated. In addition, It is not preferable that the thickness of the magnetic layer 2 exceeds the above range, because the magnetic particles in the magnetic layer 2 are enlarged. As a result, the noise during recording and reproducing increases, and the signal/noise ratio (S/N ratio) or recording characteristics (OW) deteriorates.

When the magnetic layer 2 includes a plurality of layers, it is preferable to provide a non-magnetic layer between the adjacent magnetic layers. When the magnetic layer 2 includes three layers of the first magnetic layer, the second magnetic layer and the third magnetic layer, it is preferable that the non-magnetic layer is provided between the first magnetic layer and the second magnetic layer, and between the second magnetic layer and the third magnetic layer. By providing the non-magnetic layer with an appropriate thickness between the magnetic layers, magnetization reversal of each film becomes easy. As a result, the dispersion of the magnetization reversal of the whole magnetic particles can be reduced, and the S/N ratio can be further improved.

The non-magnetic layer provided between the magnetic layers is made of, for example, Ru, Ru alloy, CoCr alloy, CoCrX1 alloy (X1 is at least one element or two or more elements selected from the group consisting of Pt, Ta, Zr, Re, Ru, Cu, Nb, Ni, Mn, Ge, Si, O, N, W, Mo, Ti, V, Zr, and B), or the like can be suitably used.

As the non-magnetic layer provided between the magnetic layers, it is preferable to use an alloy material containing an oxide, a metal nitride, or a metal carbide. Specifically, as the oxide, for example, $SiO_2$, $Al_2O_3$, $Ta_2O_5$, $Cr_2O_3$, MgO, $Y_2O_3$, $TiO_2$, or the like can be used. As the metal nitride, for example, AlN, $Si_3N_4$, TaN, CrN or the like can be used. As the metal carbide, for example, TaC, BC, SiC or the like can be used.

The thickness of the non-magnetic layer provided between the magnetic layers is preferably 0.1 to 1 nm. By setting the thickness of the non-magnetic layer within the above range, it is possible to further improve the S/N ratio.

The non-magnetic layer can be formed by a sputtering method.

In order to realize a higher recording density, the magnetic layer 2 is preferably a perpendicular magnetic recording magnetic layer in which the axis of easy magnetization is oriented perpendicular to the substrate surface. The magnetic layer 2 may be in-plane magnetic recording.

The magnetic layer 2 may be formed by any conventional method known in the art, such as vapor deposition, ion beam sputtering, magnetron sputtering or the like. The magnetic layer 2 is usually formed by a sputtering method.

The protective layer 3 protects the magnetic layer 2. The protective layer 3 may be one layer or a plurality of layers.

The protective layer 3 of the present embodiment is formed of carbon or carbon nitride. When the protective layer 3 is made of carbon or carbon nitride, since carbon atoms contained in the protective layer 3 or carbon atoms and nitrogen atoms contained in the protective layer 3 are bonded with the lubricant layer 4, the protective layer 3 and the lubricant layer 4 are bonded together with high bonding force. As a result, even if the thickness of the lubricant layer 4 is small, by using lubricant layer 4, the magnetic recording medium 11 in which a surface of the protective layer 3 is covered with a high coverage and bonding force is obtained, so that contamination of the surface of the magnetic recording medium 11 can be effectively prevented.

The thickness of the protective layer 3 is preferably in the range of 1 nm to 10 nm.

When the thickness of the protective layer 3 is 10 nm or less, the magnetic spacing in the magnetic recording/reproducing apparatus including the magnetic recording medium 11 of the present embodiment can be sufficiently reduced. Magnetic spacing means the distance between the magnetic head and the magnetic layer 2. The narrower the magnetic spacing is, the better the electromagnetic conversion characteristics of the magnetic recording/reproducing device is.

When the thickness of the protective layer 3 is 1 nm or more, the effect of protecting the magnetic layer 2 can be sufficiently obtained, and the durability can be improved.

As a method for forming the protective layer 3, when the protective layer 3 is made of carbon, a sputtering method using a carbon target material, or a CVD (chemical vapor deposition) method using a hydrocarbon material such as ethylene or toluene, an IBD (Ion beam deposition) method or the like can be used. When a protective layer 3 is made of carbon nitride, it can be formed by adding nitrogen to the raw material which is used in forming the protective layer 3 made of carbon.

The lubricant layer 4 of the present embodiment is formed in contact with the protective layer 3. As described above, the lubricant layer 4 has a predetermined film thickness containing the compound A represented by the general formula (1) and the compound B represented by the general formula (2) at a predetermined ratio. The lubricant layer 4 has extremely high bonding force and coatability to carbon or carbon nitride forming the protective layer 3.

The lubricant layer 4 prevents the contamination of the magnetic recording medium 11 and reduces the frictional force of the magnetic head of the magnetic recording/reproducing device sliding on the magnetic recording medium 11, thereby improving the durability of the magnetic recording medium 11.

The lubricant layer 4 can be formed by, for example, the following method.

First, a magnetic recording medium of preparing-in-process in which each layer up to the protective layer 3 is formed on the non-magnetic substrate 1 is prepared. Next, a lubricant layer forming solution is coated onto the protective layer 3 of the magnetic recording medium of preparing-in-process.

The lubricant layer forming solution is prepared by mixing the compound A and the compound B so that the mass ratio (A/B) of the compound A with respect to the compound B falls within the range of 0.2 to 3.0, and diluting the solution with a solvent to obtain viscosity and concentration suitable for the coating method if necessary.

Examples of the solvent to be used for the lubricant layer forming solution include fluorinated solvents such as Vertrel XF (trade name, manufactured by Mitsui Du Pont Fluorochemicals Co., Ltd.), and the like.

The method for coating the solution for forming a lubricant layer is not particularly limited, and examples thereof include a spin coating method and a dipping method.

When using the dipping method, for example, the following method can be used. First, the non-magnetic substrate 1 on which the layers up to the protective layer 3 are formed is immersed in the lubricant layer forming solution placed in a dipping tank of a dip coating apparatus. Thereafter, the non-magnetic substrate 1 is pulled up from the immersion tank at a predetermined speed. As a result, the lubricant layer forming solution is coated to the surface of the protective layer 3 of the non-magnetic substrate 1. By using the dipping method, the lubricant layer forming solution can be uniformly coated on the surface of the protective layer 3 of the non-magnetic substrate 1, and the lubricant layer 4 having a uniform thickness is formed on the protective layer 3.

The magnetic recording medium 11 of the present embodiment has at least the magnetic layer 2, the protective layer 3, and the lubricant layer 4 in this order on the non-magnetic substrate 1, and the protective layer 3 is made of carbon or carbon nitride, and the lubrication layer 4 is formed in contact with the protective layer 3. Then, the lubricant layer 4 contains the compound A represented by the general formula (1) and the compound B shown in the general formula (2), the mass ratio (A/B) of the compound A to the compound B is 0.2 to 3.0, and the average film thickness is 0.8 nm to 2 nm. As a result, the magnetic recording medium 11 of the present embodiment does not have an island-like pattern or mesh-like pattern even if the thickness of the lubricant layer 4 is thin, and by using the lubricant layer 4, the surface of the protective layer 3 is coated with a high coverage and a high bonding force.

Therefore, in the magnetic recording medium 11 of the present embodiment, contamination of the medium 11, which is generated because the environmental substance which penetrates the lower layer of the lubricant layer 4 through the void of the lubricant layer 4 aggregates the ion component existing in the lower layer of the lubricant layer 4, can be prevented.

In addition, the magnetic recording medium 11 of the present embodiment has the lubricant layer 4 that can effectively prevent contamination of the surface of the magnetic recording medium 11 even if it is thin, so that the lubricant layer 4 is sufficiently thinned. It is possible to further improve a recording density.

In addition, since the magnetic recording medium 11 of the present embodiment is resistant to contamination even when used in a high-temperature state where contamination of the magnetic recording medium 11 becomes more conspicuous, it is possible to obtain the magnetic recording medium 11 having an excellent environmental resistance and stable magnetic recording/reproducing characteristics.

"Magnetic Recording/Reproducing Apparatus"

Figure 2:
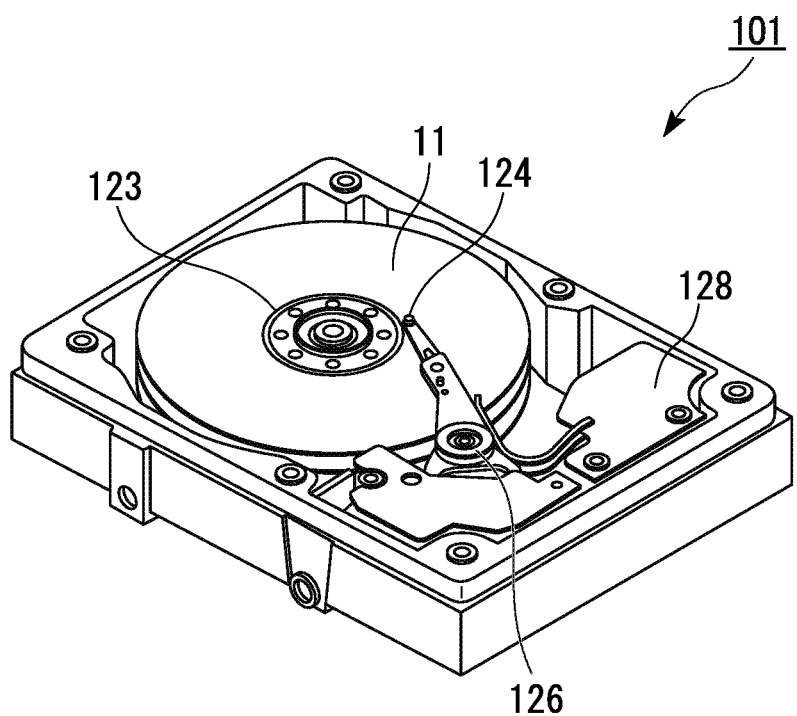
FIG. 2 is a perspective view showing an example of a magnetic recording/reproducing apparatus of the present invention.

Next, an example of the magnetic recording/reproducing apparatus of the present embodiment will be described. FIG. 2 is a perspective view showing an example of a magnetic recording/reproducing apparatus according to an embodiment of the present invention.

The magnetic recording/reproducing apparatus 101 of the present embodiment includes the magnetic recording medium 11 shown in FIG. 1, a medium driving unit 123, a magnetic head 124, a head driving unit 126, and a recording/reproducing signal processing unit 128.

The medium driving unit 123 drives the magnetic recording medium 11 in the recording direction. The magnetic head 124 performs recording and reproduction of information on the magnetic recording medium 11. The magnetic head 124 has a recording portion and a reproducing portion. The head driving unit 126 relatively moves the magnetic head 124 with respect to the magnetic recording medium 11. The recording/reproducing signal processing unit 128 processes the recording/reproducing signal from the magnetic head 124.

The magnetic recording/reproducing apparatus 101 of the present embodiment includes a magnetic recording media 11 which has few contaminants because that the surface of the protective layer 3 thereof is covered with a sufficiently high coverage and bonding force by the sufficiently thin lubricant layer 4. Therefore, it is possible to prevent contaminants existing on the magnetic recording medium 11 from being transferred to the magnetic head 124 of the magnetic recording/reproducing apparatus 101, thereby preventing deterioration of the recording/reproducing characteristics and impairment of floating stability. Therefore, the magnetic recording/reproducing apparatus 101 of the present invention has stable magnetic recording/reproducing characteristics.

Example

Hereinafter, the present invention will be described concretely based on examples. It should be noted that the present invention is not limited to only these examples.

Examples

A cleaned glass substrate (exterior shape 2.5 inches, manufactured by HOYA Corporation) is accommodated in a deposition chamber of a DC magnetron sputtering apparatus (C-3040, manufactured by Anelva Corporation), and the deposition chamber was evacuated to the ultimate vacuum degree of $1 \times 10^{-5}$ Pa.

Thereafter, an adhesion layer having a thickness of 10 nm was formed on the glass substrate by a sputtering method using a Cr target.

Next, a soft magnetic underlayer was formed on the adhesion layer by a sputtering method. As the soft magnetic underlayer, a first soft magnetic layer, an intermediate layer and a second soft magnetic layer were formed. First, using a target of Co-20Fe-5Zr-5Ta {Fe content: 20 atom %, Zr content: 5 atom %, Ta content: 5 atom %, balance: Co}, at a substrate temperature of 100° C. or less, the first soft magnetic layer having a thickness of 25 nm was formed. Next, the intermediate layer made of Ru with a thickness of 0.7 nm was formed on the first soft magnetic layer. Thereafter, the second soft magnetic layer made of Co-20Fe-5Zr-5Ta having a thickness of 25 nm was formed on the intermediate layer.

Next, a seed layer having a layer thickness of 5 nm was formed on the soft magnetic underlayer by sputtering using a target of Ni-6W (W content: 6 atom %, balance: Ni).

Thereafter, a Ru layer having a layer thickness of 10 nm was formed as a first orientation control layer on the seed layer by sputtering at a sputtering pressure of 0.8 Pa. Next, a Ru layer having a layer thickness of 10 nm was formed as a second orientation control layer on the first orientation control layer by sputtering at a sputtering pressure of 1.5 Pa.

Subsequently, the first magnetic layer made of 91(Co15Cr16Pt)-6($SiO_2$)-3($TiO_2$){91 mol % of an alloy containing 15 atom % of Cr, 16 atom % of Pt, Co as balance; 6 mol % of an oxide made of $SiO_2$; and 3 mol % of an oxide made of $TiO_2$} was formed on the second orientation control layer with a thickness of 9 nm under a sputtering pressure of 2 Pa.

Next, on the first magnetic layer, a non-magnetic layer made of 88(Co30Cr)-12($TiO_2$){88 mol % of an alloy containing 30 atom % of Cr, Co as balance; 12 mol % of an oxide made of $TiO_2$} was formed by sputtering with a layer thickness of 0.3 nm.

Thereafter, on the non-magnetic layer, a second magnetic layer made of 92(Co11Cr18Pt)-5($SiO_2$)-3($TiO_2$) {92 mol % of an alloy containing 11 atom % of Cr, 18 atom % of Pt, and a balance of Co; 5 mol % of an oxide made of $SiO_2$; and 3 mol % of an oxide made of $TiO_2$} was formed with a thickness of 6 nm under a sputtering pressure of 2 Pa.

Thereafter, a non-magnetic layer made of Ru was formed to a thickness of 0.3 nm on the second magnetic layer by a sputtering method.

Next, a third magnetic layer with a layer thickness of 7 nm was formed on the non-magnetic layer by a sputtering method under a pressure of 0.6 Pa using a target made of Co-20Cr-14Pt-3B {Cr content: 20 atom %, Pt content: 14 atom %, B content: 3 atom %, balance: Co}.

Next, a hard carbon film having a layer thickness of 3 nm was formed by an ion beam method. Thereafter, the outermost surface of the hard carbon film was nitrided by nitrogen plasma treatment to form a protective layer. The nitrogen content of the surface layer portion of the protective layer was about 40 atom %.

Next, a compound A and compound B shown below or other compounds were dissolved in a solvent shown below to prepare a solution for forming a lubricant layer. Then, the obtained lubricant layer forming solution was placed in a dipping tank of a dip coating apparatus, and the non-magnetic substrate on which each layer up to the protective layer was formed was immersed. Thereafter, by pulling up the non-magnetic substrate from the immersion tank at a constant speed, the lubricant layer forming solution was coated to the surface of the protective layer of the non-magnetic substrate to form the lubricant layer. By carrying out the above steps, the magnetic recording media of Examples 1 to 26 and Comparative Examples 1 to 10 were obtained.

(Compound A)
ART-1 (trade name: manufactured by MORESCO)
DART-1 (Trade Name: Manufactured by MORESCO)
Average Molecular Weight 1700

(Compound B)
An alcohol used as a precursor of the perfluoropolyether was modified to synthesize the triol compound of the formula (2). The precursor of the perfluoropolyether was adjusted so that the average molecular weight was 1700.

(Other Compounds)
D4OH (trade name: manufactured by MORESCO)
D4OH has p in the range of 4 to 30 in the following general formula (3) and an average molecular weight of about 2500.

"Solvent"
Vertrel XF (trade name: manufactured by Mitsui Dupont Fluorochemicals Co., Ltd.)

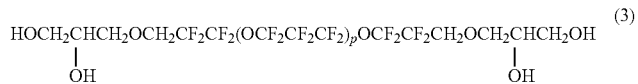

(3)

(In the general formula (3), p is within the range of 4 to 30.)

For the magnetic recording media of Examples 1 to 26 and Comparative Examples 1 to 10, an average film thickness of the lubricant layer was measured by Fourier Transform Infrared Spectroscopy (FT-IR). The results are shown in Table 1 and Table 2. The mass ratio (A:B) of Compound A to Compound B contained in the lubricant layer and the mass ratio (A/B) of Compound A with respect to Compound B are shown in Tables 1 and 2.

The magnetic recording media of Examples 1 to 26 and Comparative Examples 1 to 10 were evaluated by using $\gamma^{total}(\gamma^{AB}+\gamma^{LW})$ which were obtained by using $\gamma^{AB}$ (bonding force) and $\gamma^{LW}$ (coverage) of the lubricant layers which were measured by the above-described method. Three kinds of solvents including water, methylene iodide and ethylene glycol were used as solvents for measuring the contact angle of the magnetic recording medium surface (on the protective layer), and the evaluation results are shown in Table 1 and Table 2.

TABLE 1

| | Lubricant | | | | Average thickness (nm) | Evaluation | | |
|---|---|---|---|---|---|---|---|---|
| | Compound A | Compound B | Other Compounds | A:B | A/B | | $\gamma^{AB}$ | $\gamma^{LW}$ | $\gamma^{AB}+\gamma^{LW}$ ($\gamma^{total}$) |
| Example 1 | ART-1 | Equation (2) | | 4:6 | 0.67 | 1 | 4.29 | 20.67 | 24.96 |
| Example 2 | ART-1 | Equation (2) | | 5:5 | 1.0 | 1 | 3.94 | 20.54 | 24.48 |
| Example 3 | ART-1 | Equation (2) | | 6:4 | 1.5 | 1 | 4.48 | 20.80 | 25.27 |
| Example 4 | ART-1 | Equation (2) | | 5:5 | 1 | 1.2 | 4.49 | 19.59 | 24.08 |
| Example 5 | ART-1 | Equation (2) | | 5:5 | 1 | 1.4 | 4.40 | 18.97 | 23.37 |
| Example 6 | ART-1 | Equation (2) | | 5:5 | 1 | 1.6 | 4.28 | 18.66 | 22.94 |
| Example 7 | ART-1 | Equation (2) | | 5:5 | 1 | 1.8 | 4.24 | 18.35 | 22.59 |
| Example 8 | ART-1 | Equation (2) | | 5:5 | 1 | 2 | 4.20 | 18.27 | 22.47 |
| Example 9 | ART-1 | Equation (2) | | 3:7 | 0.43 | 1 | 4.29 | 20.37 | 24.65 |
| Example 10 | ART-1 | Equation (2) | | 2:8 | 0.25 | 1 | 4.24 | 20.46 | 24.71 |
| Example 11 | ART-1 | Equation (2) | | 7:3 | 2.3 | 1 | 4.58 | 19.75 | 24.33 |
| Example 12 | ART-1 | Equation (2) | | 5:5 | 1 | 0.8 | 4.62 | 20.81 | 25.42 |
| Example 13 | ART-1 | Equation (2) | | 3:1 | 3 | 1 | 4.92 | 20.46 | 25.38 |
| Comparative Example 1 | ART-1 | Equation (2) | | 8:2 | 4 | 1 | 5.71 | 20.56 | 26.27 |
| Comparative Example 2 | ART-1 | Equation (2) | | 2:11 | 0.18 | 1 | 4.31 | 21.28 | 25.59 |
| Comparative Example 3 | ART-1 | Equation (2) | | 5:5 | 1 | 0.6 | 6.71 | 26.27 | 32.98 |
| Comparative Example 4 | ART-1 | | | | | 1 | 10.48 | 21.39 | 31.87 |
| Comparative Example 5 | | Equation (2) | | | | 1 | 4.39 | 22.42 | 26.81 |
| Comparative Example 6 | | | D4OH | | | 1 | 6.07 | 20.66 | 26.73 |

TABLE 2

| | Lubricant | | | | | Average film thickness (nm) | Evaluation | | |
|---|---|---|---|---|---|---|---|---|---|
| | Compound A | Compound B | Other Compounds | A:B | A/B | | $\gamma^{AB}$ | $\gamma^{LW}$ | $\gamma^{AB}+\gamma^{LW}$ ($\gamma^{total}$) |
| Example 14 | DART-1 | Equation (2) | | 4:6 | 0.67 | 1 | 4.51 | 21.70 | 26.21 |
| Example 15 | DART-1 | Equation (2) | | 6:7 | 0.86 | 1 | 4.14 | 21.57 | 25.71 |
| Example 16 | DART-1 | Equation (2) | | 6:4 | 1.5 | 1 | 4.70 | 21.83 | 26.54 |
| Example 17 | DART-1 | Equation (2) | | 6:7 | 0.86 | 1.2 | 4.71 | 20.57 | 25.28 |
| Example 18 | DART-1 | Equation (2) | | 6:7 | 0.86 | 1.4 | 4.62 | 19.92 | 24.54 |
| Example 19 | DART-1 | Equation (2) | | 6:7 | 0.86 | 1.6 | 4.49 | 19.60 | 24.09 |
| Example 20 | DART-1 | Equation (2) | | 6:7 | 0.86 | 1.8 | 4.45 | 19.28 | 23.73 |
| Example 21 | DART-1 | Equation (2) | | 6:7 | 0.86 | 2 | 4.41 | 19.18 | 23.59 |
| Example 22 | DART-1 | Equation (2) | | 3:7 | 0.43 | 1 | 4.50 | 21.38 | 25.88 |
| Example 23 | DART-1 | Equation (2) | | 2:8 | 0.25 | 1 | 4.46 | 21.48 | 25.94 |
| Example 24 | DART-1 | Equation (2) | | 7:3 | 2.3 | 1 | 4.80 | 20.74 | 25.54 |

TABLE 2-continued

| | Lubricant | | | | | Average film thickness (nm) | Evaluation | | |
|---|---|---|---|---|---|---|---|---|---|
| | Compound A | Compound B | Other Compounds | A:B | A/B | | $\gamma^{AB}$ | $\gamma^{LW}$ | $\gamma^{AB} + \gamma^{LW}$ ($\gamma^{total}$) |
| Example 25 | DART-1 | Equation (2) | | 6:7 | 0.86 | 0.8 | 4.85 | 21.84 | 26.70 |
| Example 26 | DART-1 | Equation (2) | | 3:1 | 3 | 1 | 5.16 | 21.48 | 26.65 |
| Comparative Example 7 | DART-1 | Equation (2) | | 8:2 | 4 | 1 | 6.00 | 21.59 | 27.59 |
| Comparative Example 8 | DART-1 | Equation (2) | | 2:11 | 0.18 | 1 | 4.53 | 22.34 | 26.87 |
| Comparative Example 9 | DART-1 | Equation (2) | | 6:7 | 0.86 | 0.6 | 7.05 | 27.59 | 34.63 |
| Comparative Example 10 | DART-1 | | | | | 1 | 11.01 | 22.46 | 33.47 |

As shown in Tables 1 and 2, in the magnetic recording media of Examples 1 to 26, as compared with the magnetic recording media of Comparative Example 1 to Comparative Example 10, the total surface energy on the surface of the magnetic recording medium ($\gamma^{total}(\gamma^{AB}+\gamma^{LW})$) was low. Therefore, in the magnetic recording media of Examples 1 to 26, it is presumed that the coverage of the surface of the protective layer was high and the bonding force was also high.

In contrast, since the amount of the compound A is too large in Comparative Example 1 and Comparative Example 7, the surface energy ($\gamma^{total}(\gamma^{AB}+\gamma^{LW})$) increases. Since the amount of the compound B is too large in Comparative Example 2 and Comparative Example 8, the surface energy ($\gamma^{total}(\gamma^{AB}+\gamma^{LW})$) increases. It is presumed that the coverage and bonding force to the surface of the protective layer are insufficient.

In Comparative Example 3 and Comparative Example 9, the average film thickness of the lubricant layer was too thin, so that the surface energy ($\gamma^{total}(\gamma^{AB}+\gamma^{LW})$) became high. It is presumed that the coverage and the bonding force to the surface of the protective layer by the lubricant layer are insufficient.

Since the compound B is not contained in Comparative Example 4 and Comparative Example 10, the surface energy ($\gamma^{total}(\gamma^{AB}+\gamma^{LW})$) increases. Since the compound A is not contained in Comparative Example 5, the surface energy ($\gamma^{total}(\gamma^{AB}+\gamma^{LW})$) increases. It is presumed that the coverage and bonding force to the surface of the protective layer are insufficient.

Further, in Comparative Example 6, since the compound is a lubricant having a structure having four OH groups, the surface energy ($\gamma^{total}(\gamma^{AB}+\gamma^{LW})$) is increased. It is presumed that the coverage and bonding force to the surface of the protective layer are insufficient.

INDUSTRIAL APPLICABILITY

The magnetic recording medium and the magnetic recording/reproducing apparatus of the present invention have a possibility of being utilized in industries utilizing and manufacturing high recording density magnetic recording media and magnetic recording/reproducing apparatuses.

DENOTATION OF REFERENCE NUMERALS

1: Non-magnetic Substrate
2: Magnetic Layer
3: Protective Layer
4: Lubricant Layer
11: Magnetic Recording Medium
101: Magnetic Recording/Reproducing Apparatus
123: Medium Driving Unit
124: Magnetic Head
126: Head Driving Unit
128: Recording/Reproducing Signal Processing Unit

The invention claimed is:
1. A magnetic recording medium comprising at least a magnetic layer, a protective layer and a lubricant layer in this order on a non-magnetic substrate, wherein
the protective layer is made of carbon or carbon nitride;
the lubricant layer which is formed on and in contact with the protective layer, comprises
a compound A represented by the following general formula (1):

$$R^1\text{—}C_6H_4OCH_2CH(OH)CH_2OCH_2\text{—}R^2\text{—}CH_2OCH_2CH(OH)CH_2OH \quad (1)$$

wherein, $R^1$ is an alkoxy group having 1 to 4 carbon atoms,
$R^2$ is $$\text{—}CF_2O(CF_2CF_2O)_x(CF_2O)_yCF_2\text{—}$$

wherein in parentheses of x and y, connection in this order, in reverse, or randomly; and x, y are real numbers of 0 to 15, respectively, $$\text{—}CF_2CF_2O(CF_2CF_2CF_2O)_zCF_2CF_2\text{—}$$

wherein z is a real number of 1 to 15, or $$\text{—}CF_2CF_2CF_2O(CF_2CF_2CF_2CF_2O)_nCF_2CF_2CF_2\text{—}$$

wherein n is a real number from 0 to 4, and
a compound B represented by the following general formula (2):

$$HOCH_2CF_2CF_2O(CF_2CF_2CF_2O)_m CF_2CF_2CH_2OCH_2CH(OH)CH_2OH \quad (2)$$

wherein m is an integer;
a mass ratio (A/B) of the compound A with respect to the compound B is in the range of 0.2 to 3.0; and
an average film thickness of the lubricant layer is 0.8 nm to 2 nm.
2. The magnetic recording medium according to claim 1, wherein the total surface energy on the surface of the magnetic recording medium is 25.5 mJ/m² or less.

3. The magnetic recording medium according to claim 1, wherein the compound A has an average molecular weight in the range of 1,500 to 1,800.

4. The magnetic recording medium according to claim 1, wherein the compound B has an average molecular weight in the range of 1,000 to 1,700.

5. A magnetic recording/reproducing apparatus comprising:
- the magnetic recording medium according to claim 1,
- a medium drive unit that drives the magnetic recording medium in a recording direction,
- a magnetic head for recording/reproducing information on the magnetic recording medium,
- a head driving unit for driving the magnetic head relative to the magnetic recording medium, and
- a recording/reproducing signal processing unit for processing a recording/reproducing signal from the magnetic head.

* * * * *